United States Patent [19]
Whitfield et al.

[11] Patent Number: 5,204,708
[45] Date of Patent: Apr. 20, 1993

[54] METHOD AND APPARATUS FOR MAGNETICALLY COMMUNICATING VIA A PHOTOGRAPHIC FILMSTRIP WITH ENHANCED RELIABILITY

[75] Inventors: Arthur A. Whitfield, Rochester, N.Y.; Michael L. Wash, Fort Collins, Colo.; Fernando G. Silva; Paul L. Taillie, both of Rochester, N.Y.

[73] Assignee: Eastman Kodak Company, Rochester, N.Y.

[21] Appl. No.: 811,390

[22] Filed: Dec. 20, 1991

[51] Int. Cl.⁵ .............................. G03B 17/24
[52] U.S. Cl. ........................ 354/105; 355/41; 360/47
[58] Field of Search ........... 354/105, 106; 355/40, 355/41; 360/47, 53

[56] References Cited

U.S. PATENT DOCUMENTS

| | | | |
|---|---|---|---|
| Re. 31,166 | 3/1983 | Korda | 360/53 |
| 2,628,346 | 2/1953 | Burkhart | 340/174 |
| 3,626,160 | 12/1971 | Hagoplan | 235/61.11 |
| 3,683,413 | 8/1972 | Schlaepfer | 340/174.1 |
| 3,769,465 | 10/1973 | Wellbrock | 179/100.2 |
| 4,340,286 | 7/1982 | Carr | 354/105 |
| 4,415,938 | 11/1983 | Heitmann | 360/53 |
| 4,616,272 | 10/1986 | Moriyama | 360/47 |
| 4,772,963 | 9/1988 | Van Lahr | 360/47 |
| 4,796,110 | 1/1989 | Glass | 360/53 |
| 4,876,697 | 10/1989 | Whitfield | 375/22 |
| 4,914,467 | 3/1990 | Whitfield | 341/53 |
| 4,933,780 | 6/1990 | Wash | 360/1 |
| 4,964,139 | 10/1990 | Wash | 375/23 |
| 4,965,575 | 10/1990 | Wash | 341/72 |
| 4,965,627 | 10/1990 | Robison | 355/40 |

OTHER PUBLICATIONS

Eastman Kodak Company, "Datakode Magnetic Control Surface", 52 pages, 1984.

Primary Examiner—Michael L. Gellner
Assistant Examiner—Howard B. Blankenship
Attorney, Agent, or Firm—Heslin & Rothenburg

[57] ABSTRACT

The reliability of data transfer between stages of photographic filmstrip use and processing is enhanced by magnetically recording a limited data set repetitively along a wide track in a frame of the filmstrip. Plural laterally offset magnetic read heads monitor the data in the magnetic track and provide output data signals on parallel independently operating channels. The data content of the output data signals is examined to determine whether the data of an individual data signal contains corruption error. The combined linear and parallel redundancy of the system tends to ensure successful data transfer despite a less than perfect head-to-film interface and other data corrupting influences.

22 Claims, 3 Drawing Sheets

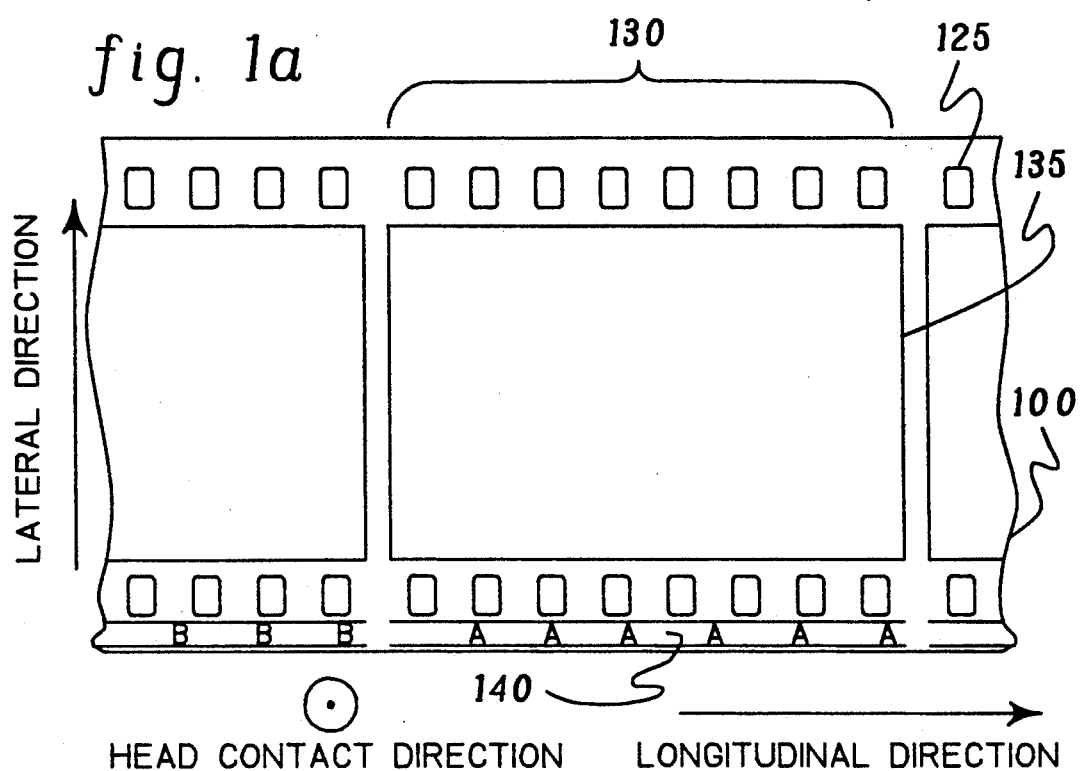
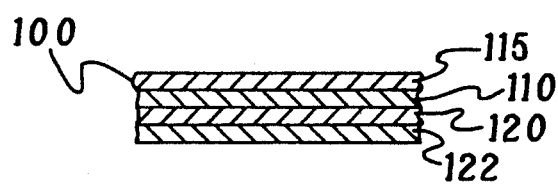
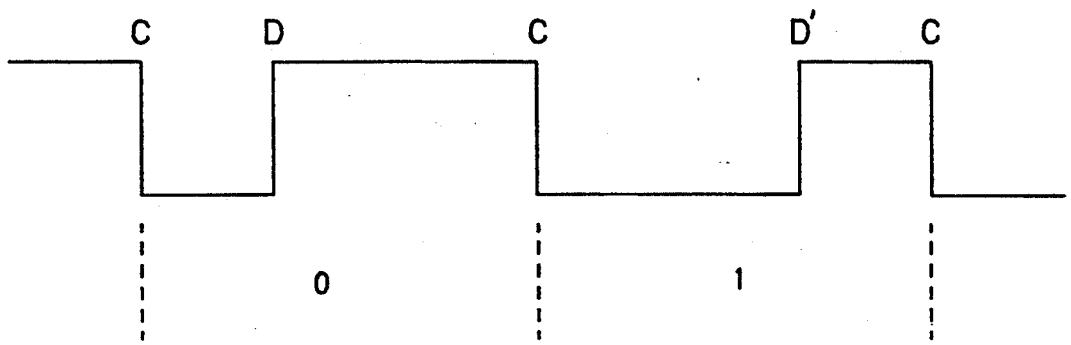

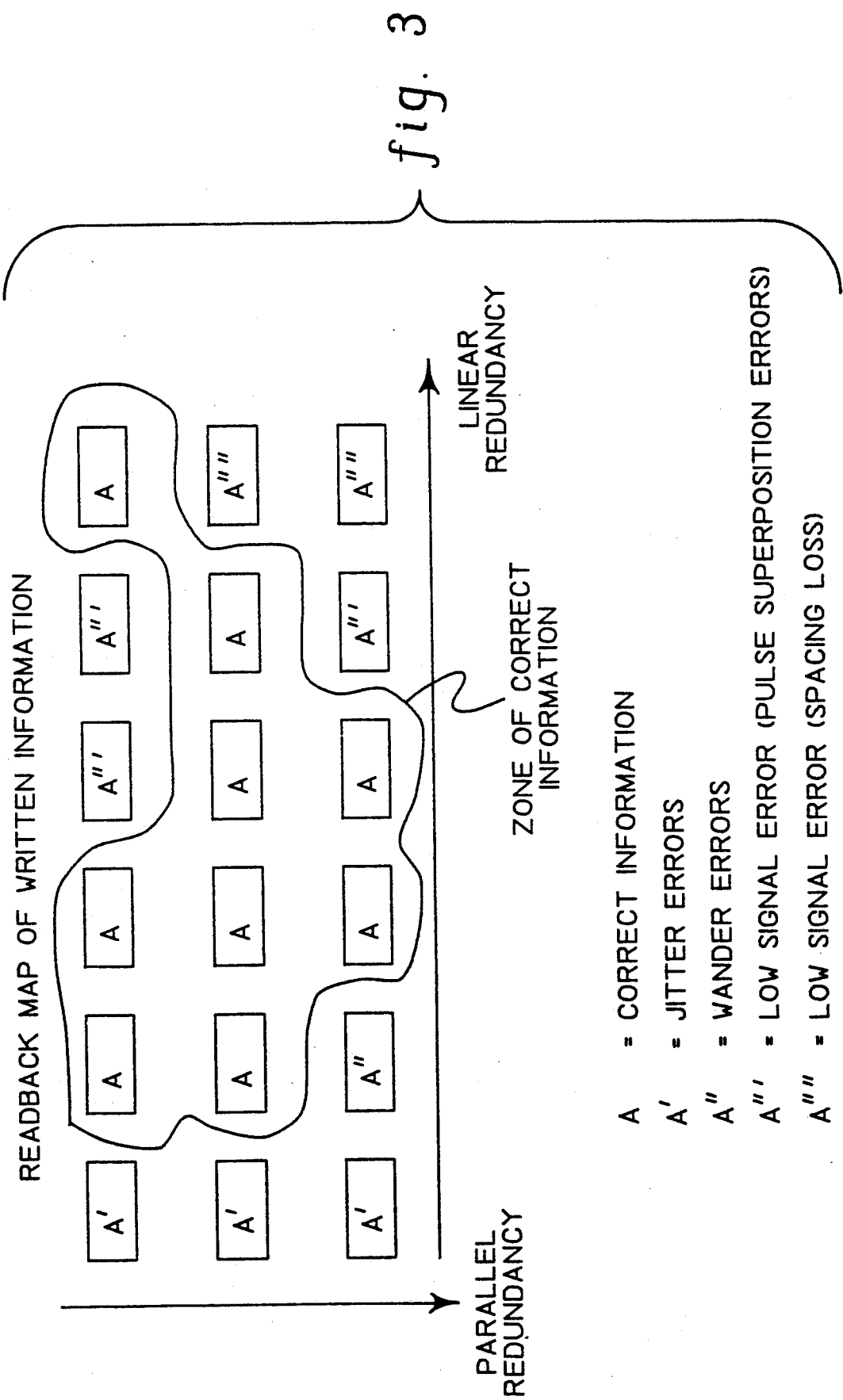

METHOD AND APPARATUS FOR MAGNETICALLY COMMUNICATING VIA A PHOTOGRAPHIC FILMSTRIP WITH ENHANCED RELIABILITY

BACKGROUND OF THE INVENTION

1. Technical Field

This invention relates generally to data communication between stages of photographic filmstrip use and processing wherein data is recorded in a magnetic layer of the photographic filmstrip at a first stage and read out at a second stage. More particularly, the invention relates to a method and apparatus for enhancing the reliability of such data transfer.

1. Background Information

Data communication between different stages of film use and processing (e.g. a camera user and dealer or photofinisher) has traditionally required separate written forms. This has not proven to be a very convenient or efficient method of relaying important information from one stage to another.

In the early 1960's, an innovation in data communication for motion picture film was introduced. A thin layer of magnetic oxide, referred to as a DATAKODE Magnetic Control Surface, was coated across the entire back surface of a roll of motion picture film to provide the capability to magnetically record digital data on the film without interfering with normal photographic use of the film.

The DATAKODE Magnetic Control Surface permitted recording of different types of digital data at different stages of production of a motion picture. Such data could range from camera, lighting and filter data at the time of shooting to printer exposure control information in the laboratory to theatre automation control signals during exhibition. The availability of the DATAKODE Magnetic Control Surface over the entire surface of the motion picture film allowed multiple types of data to be recorded on the same piece of film.

The DATAKODE Magnetic Control Surface was specifically applied to the recording of SMPTE time and control code on motion picture films. In implementing this technology head-to-film contact was recognized as one of the most important factors in getting good quality time-code signal recordings. Both recording heads and playback heads needed to be mounted in a manner that maintained intimate and stable contact between the film and the gap of the magnetic head.

More recently, a film information exchange system using dedicated magnetic tracks has been developed for use in still photography. A virtually transparent magnetic layer on the still photography filmstrip facilitates the magnetic recording of data in one or more longitudinal tracks of each film frame. With a virtually transparent magnetic layer, data recording may be done everywhere on the filmstrip including in the image area, so that all relevant information can theoretically be recorded with each frame on the film. U.S. Pat. No. 4,965,627 issued Oct. 23, 1990 describes such a system, the disclosure of which is incorporated by reference herein. In order to provide quick access to particular data at any stage of film use, related data is preferably grouped and recorded in specific predetermined tracks. Camera data is recorded in several dedicated longitudinal tracks located along the filmstrip edges. The camera data, as well as other data, is preferably recorded in pulse position encoded form in order to be independent of film transport velocity. Other new features and advantages of the Film Information Exchange System Using Dedicated Magnetic Tracks are described in U.S. Pat. No. 4,965,627 and the related patents referenced therein.

As in the earlier DATACODE Magnetic Control Surface application, the Film Information Exchange System Using Dedicated Magnetic Tracks of U.S. Pat. No. 4,965,627 requires a high quality head-to-film interface (HFI) over the entire write/read cycle in order to ensure that a complete set of data is transferred between different stages of film processing and use. In implementing this system in a camera, for example, a load pad is needed for high quality HFI. Due to the required load force, the load pad must be unloaded from the film when magnetics is not in use, in order to prevent dimpling of the film and out-of-flat negatives that might risk the photographic quality. Such an unload mechanism adds cost and complexity to the camera.

Also, to deliver a full set of camera data, it is desirable to employ an edge guided magnetic recording subsystem in the camera. This subsystem may need to be unloaded when magnetics is not in use for the same reason as the load pad again increasing the cost and complexity of the camera. Accordingly, implementation of a read-/write magnetics subsystem in a camera can pose a significant cost problem, particularly for relatively inexpensive cameras.

To eliminate the need for a camera load pad which has to be unloaded from the film when not in use, a relatively simple and inexpensive constant contact load pad might be devised. However, such a simple constant contact load pad may not be sufficient to maintain a quality head-to-film interface throughout an entire film frame, thereby potentially compromising the reliability of data transfer.

In the earlier applications of a virtually transparent magnetic surface to motion picture and still photography filmstrips, a 1:1 relationship between the number of recording heads and playback heads was employed. The paired recording head and playback head were of the same width or, as shown in FIG. 4 of U.S. Pat. No. 4,965,627, the width of the playback head could be made smaller than that of the recording head in order to accommodate lateral meandering of the recorded track.

In other environments, various approaches have been developed for centering a readback head relative to a magnetic track. U.S. Reissue Pat. RE. 31,166 describes a system for reading a relatively wide magnetically recorded track with a relatively narrow read head located at the approximate center of the track. Illegible information recorded along the track is recovered by moving the read head transverse to the track length from a normal position to a new track position.

Instead of mechanically positioning a playback head, various approaches for electronically selecting appropriate head(s) centered over a magnetic track have been suggested. U.S. Pat. No. 3,769,465 describes a high density recording system which employs a plurality of fixedly positioned playback heads to read information from each of several adjacent tracks on a magnetic recording surface. Electronic gating is used to select the transducer(s) presently centered over a track to be read out. A first plurality of transducers monitor a guard band on the magnetic recording surface. These transducers detect the lateral edge of recorded information. The tracks on the magnetic surface are in a fixed position relative to this lateral edge. Detection of the lateral edge thus permits the electronic selection of transducers which will be centered over each track on the recording surface. In one embodiment of this earlier patented system a centered pair of adjacent transducers is electronically selected for each track and the outputs of the pair of transducers are summed.

Another approach for electronically selecting read back heads centered over a magnetic track is described in U.S. Pat. No. 4,616,272. This patent describes a digital signal reproducing apparatus for reading data from a magnetic tape having n tracks. A guard band separates each pair of adjacent tracks. The reproducing apparatus includes n reproducing element groups provided in correspondence with the n tracks. Each of the reproducing element groups includes a plurality of reproducing elements arranged in the tape width direction over a range of a corresponding track and guard bands on both sides thereof. The reproducing elements of a group monitor the magnetic field intensity distribution. Outputs of those reproducing elements opposing a uniform part of the magnetic field intensity distribution are selectively added to produce a combined output for a track.

The electronic servo approaches of U.S. Pat. Nos. 3,769,465 and 4,616,272 rely on the existence of guard band(s) in predetermined relationship to the magnetic tracks and assume a good head-to-film interface at the recording and playback heads. Both of these techniques are directed towards electronic selection of playback heads which are physically centered with regard to a track and sum the outputs of such heads to produce an output signal. Neither of these patents recognize, address or resolve the problems associated with data transfer via magnetic recording on a photographic filmstrip, especially when good HFI is not guaranteed.

In addition to cost and HFI considerations, the application of magnetics on photographic film to transfer data raises other unique concerns. For instance, the filmstrip which serves as the magnetic recording medium may experience jitter caused by the film transport mechanism, spacing losses due for example to dimples in the film or to dirt, and track wander if the film is laterally displaced relative to the recording head during the recording process. Such physical disturbances can result in the introduction of corruption errors in the transferred data.

A need therefore exists for a technique for ensuring the reliable transfer of data via magnetic recording on a photographic filmstrip when persistent high quality HFI cannot be guaranteed and when the data transfer is subject to such corruption errors.

SUMMARY OF THE INVENTION

This need is satisfied, the limitations of the prior art overcome, and other benefits realized, in accordance with the principles of the present invention, through the inclusion of parallel redundancy, linear redundancy and data content evaluation in the data transfer process. Beginning with the recognition that simple cameras need only deliver a limited data set, the present invention replaces the multitrack edge-guided recording subsystem of the earlier magnetics system with a single wide recording head in a fixed (not floating edge-guided) mount. This recording head records data in a wide longitudinally extending track or swath in a film frame of the photographic filmstrip at a first stage of filmstrip use and processing. The swath has a width which spans a plurality of laterally offset magnetic read heads associated with the track. The read heads are part of data readout and evaluation apparatus at a second stage of photographic filmstrip use and processing. At least one of said read heads is always aligned with the swath regardless of swath lateral excursion. The plural laterally offset magnetic read heads read said track in parallel providing parallel redundancy. A plurality of data signal channels equal in number to the plurality of read heads are connected to respective ones of said read heads and provide data signals representative of magnetic readout of said heads. Data evaluation means receive said data signals from said channels, examine the data content of said signals and determine therefrom whether an individual data signal contains data which has been transferred without corruption error.

The parallel redundancy provided by the data readout apparatus of the present invention enhances the probability that correct information will be transferred. The data evaluation means of the present invention provides a mechanism for determining whether the received data is valid.

Since perfect HFI over the entire photographic frame may not be guaranteed, the data recording apparatus of the present invention provides for full-width recording of a limited data set repetitively along the longitudinally extending track in the film frame. This linear redundancy ensures that data will be transferred reliably even though HFI may suffer from time to time across the photographic frame.

The present invention permits the use of a simple constant contact load pad and fixed head mount in the recording subsystem thereby substantially lowering cost and complexity in the recording stage, e.g. camera. The use of a single recording head also results in lower head cost and lower cost of head electronics compared to a full magnetics multi-head recording system. The use of a single wide written track in conjunction with multiple laterally offset read heads also facilitates flawless data synchronization in a parallel sense.

In one aspect of the present invention, the data evaluation means of the second stage includes means for storing the data signals, and error detection means for detecting corruption error in said stored data signals. Errors can be detected by examining the data content of an individual stored data signal and/or by comparing the data content of multiple stored data signals.

In a further aspect of the present invention, data is magnetically recorded in said longitudinally extending track in encoded form. In a preferred embodiment, the data is magnetically recorded in pulse position encoded form. In the latter case, each readout channel includes a pulse detector for receiving an amplified output signal from the read head of the channel and providing a positive pulse signal indicative of occurrence of a positive pulse in said amplified output signal and a negative pulse signal indicative of occurrence of a negative pulse in said amplified output signal to a decoder of the channel. The decoder generates a binary stream which can be stored in a serial memory for data evaluation. The data evaluation can include one or more of the following tests: a parity check, a longitudinal redundancy check, a comparison to a priori knowledge of expected data content, and a comparison between synchronous binary streams.

The present invention encompasses apparatus and methods for data recording, data readout and evaluation, and overall data transfer in accordance with the principles described herein.

BRIEF DESCRIPTION OF THE DRAWINGS

The foregoing and other features, aspects and advantages of the present invention will be readily understood from the following detailed description of a preferred embodiment, when considered in conjunction with the accompanying drawings, in which:

FIG. 1A is a partial plan view of a photographic filmstrip having a longitudinally extending wide track or swath in accordance with the principles of the present invention;

FIG. 1B is a cross-sectional view of the filmstrip of FIG. 1A;

FIG. 1C depicts a pulse position encoding scheme advantageously employed in the present invention;

FIG. 3 presents a data readback map useful in understanding the benefits of the present invention.

DETAILED DESCRIPTION

Figure 2:
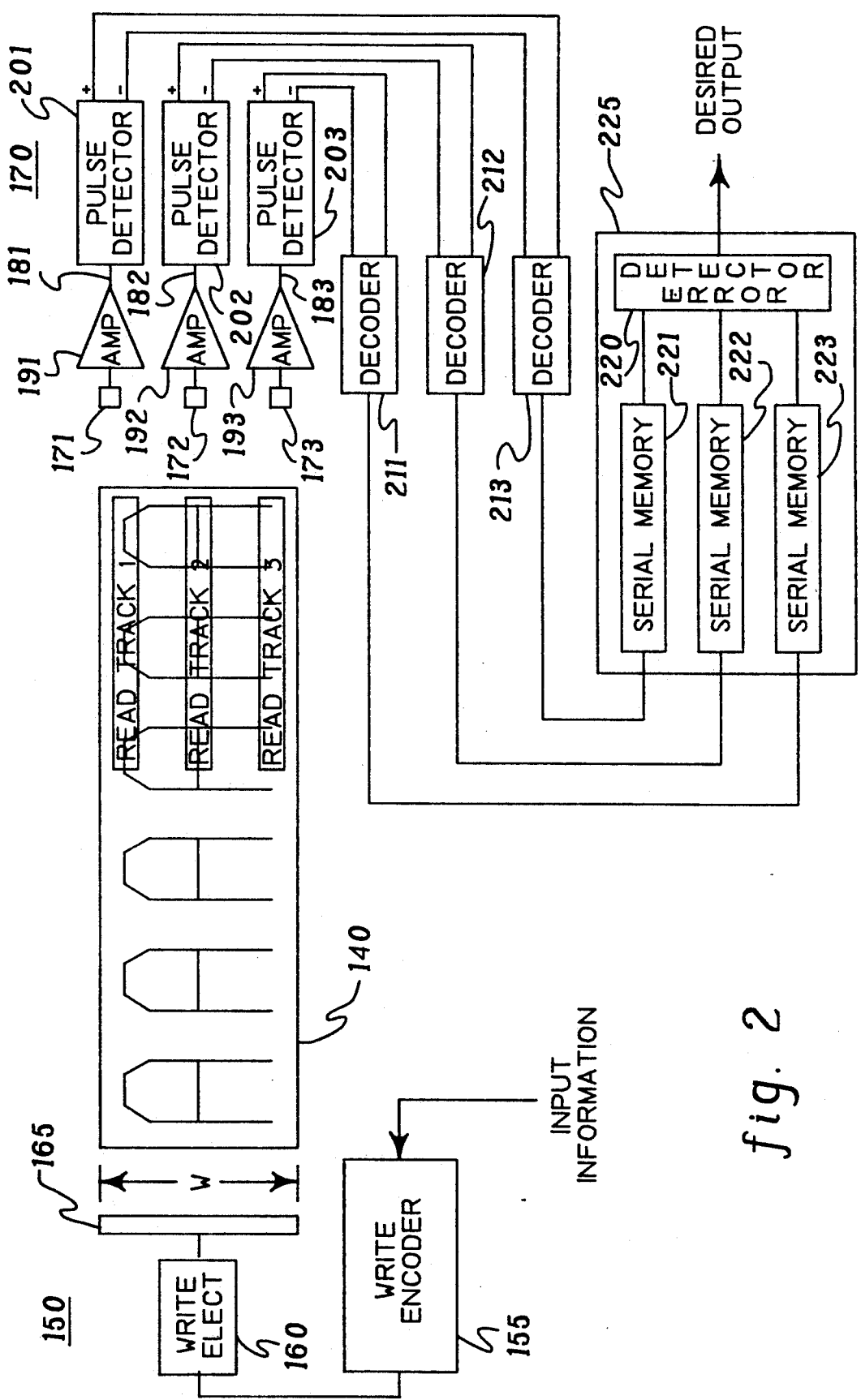
FIG. 2 is a schematic illustration of the data transfer apparatus of the present invention.

The present invention is especially designed to enhance the reliability of data transfer between stages of photographic filmstrip use and processing. The stages can include a film manufacturing operation, a camera, a dealer order entry station, and a photofinisher. Other stages, or substations of these stages, may be included in the film use and processing system. The photofinisher, for example, may include order entry, classifier, printer, inspection and makeover, sorter, and enveloper stations, each with independent data communication capabilities. The present invention is applicable to data communication between any of said stages and stations but for ease of discussion, will be described in the context of data communication between a camera and a photofinisher.

Data communication between different stages of photographic filmstrip processing and use is effected by employing the filmstrip as a magnetic recording medium. Referring to FIGS. 1A and 1B, a strip 100 of color negative film 35 mm wide includes a base 110, various well-known photo-chemical layers 115 on one side of the base 110, and a magnetic layer 120 on the other side. An anti-static and lubricating layer 122 overlies the magnetic layer 120. Filmstrip 100 includes perforations 125 spaced along both film edges at regular intervals matching the pitch of a metering pawl of a film transport system in a camera (not shown). Filmstrip 100 further includes a series of consecutive frames 130 each having a central image area 135.

If data is to be magnetically recorded in the vicinity of image area 135, magnetic layer 120 is made virtually transparent at least in that portion of the magnetic layer which is coextensive with image area 135. This permits normal photofinishing of an exposed image in image area 135. If the magnetic recording material is excluded from image area 135, it need not be virtually transparent. Suitable materials for forming the magnetic layer 120 include a thin layer of ferric oxide or other compositions with similar characteristics which are familiar to those skilled in this art.

In the earlier developed high density full magnetics data transfer system, multiple longitudinally extending tracks were dedicated to magnetic recording of a full complement of camera related data. However, in accordance with the precepts of the present invention, only a single relatively wide track or swath 140 is used to record camera data. Since in inexpensive cameras only a limited set of data (e.g. scene information, date and time) needs to be delivered, the data set ("A") is written multiple times along the length of swath 140. A limited data set e.g. of 80 bits can thus be repeated six times within a 24 mm track of a film frame at 20 bits per millimeter nominal bit density. This linear redundancy significantly reduces the length of film over which good HFI must be maintained. In the case of an 80-bit data set, intimate contact between the head and film would be necessary for only approximately 4 mm rather than 24 mm. Linear redundancy thus compensates for compromise in HFI which may result from employing a simple low-cost constant contact load pad in an inexpensive camera.

Data is preferably recorded in longitudinal track 140 using a pulse position encoding scheme. Data to be recorded is first converted into binary bits and then encoded using a three-part code. As illustrated in FIG. 1C, the code comprises a serial stream of pulse edge transitions of a first type (e.g. negative-going edge transitions) and those of a second type (e.g. positive-going edge transitions) in alternating sequence. The first type pulse transitions serve as clock ("C") indicators while the second type serve as binary data indicators. A binary 0 is indicated by a second type pulse transition "D" which is temporally closer to the immediately preceding clock ("C") pulse transition and farther from the succeeding clock transition. A binary 1 is indicated by a second type pulse transition ("D'") temporally closer to the succeeding clock pulse transition than to the preceding one. With this pulse position encoding scheme, film transport velocity can vary during recording and playback without affecting the ability to synchronize and read the recorded data. Thus, for example, a camera may record data in track 140 while advancing the film between exposures without imposing any velocity controls or requiring recording of an independent clock signal. Alternatively, other data encoding techniques which afford film-velocity independence can be used.

Track 140 is created by displacing filmstrip 100 in a longitudinal direction past a wide stationary recording head. The film is moved by a film transport mechanism (not shown) of the camera. Film jitter in the longitudinal direction may produce pulse position errors. Spacing errors in the head contact direction due, for example, to dimples in the film or to dirt can also corrupt data transfer. Superpositioning of adjacent pulses may result in low signal error. The filmstrip 100 may also wander in a lateral direction relative to the stationary recording head causing track 140 to meander from its nominal track path. The present invention recognizes that such discontinuities in the three orthogonal directions can introduce corruption errors in the transferred data and accordingly includes means for detecting such errors in the data readout and evaluation apparatus discussed hereinafter.

FIG. 2 presents a simplified schematic depiction of the data transfer system of the present invention. Data is magnetically written in the swath 140 of the photographic filmstrip by data recording apparatus 150 at a first station, e.g. a camera, and retrieved by data readout and evaluation apparatus 170 at a second station, e.g. a photofinisher. Input information such as a limited data set from an inexpensive camera, in binary form, is provided to write encoder 155. Encoder 155 preferably encodes the input digital information in pulse position encoded form, as previously described. Suitable encoding circuitry is described in commonly assigned U.S. Pat. No. 4,912,467, the disclosure of which is incorporated herein by reference. The output of encoder 155 is provided to write electronics 160. Write electronics 160 may comprise an H bridge, center tap head or other conventional drive electronics for the single wide write head 165.

Write head 165 magnetically records the input information, e.g. limited data set "A", repetitively along swath 140 in a film frame. Write head 165 and the corresponding written track 140 have a width "W" which spans a plurality of laterally offset read heads associated with track 140 in the readout apparatus 170. Write or recording head 165 can be fixedly mounted in the camera (i.e. not film edge guided) to reduce cost, provided that track 140 is aligned with at least one of the associated read heads regardless of its lateral excursion.

Laterally offset magnetic read heads 171, 172, and 173, in data readout and evaluation apparatus 170, are positioned to scan along corresponding parallel, laterally offset read tracks 1, 2, and 3 along the nominal path of track 140 as the photographic filmstrip is transported past the read heads. The read heads might, for example, have an individual head width of 0.5 mm and be spaced 1.5 mm apart, center to center, to monitor a 4.5 mm wide swath. Parallel independently operating channels 181, 182, and 183 are connected to read heads 171, 172 and 173, respectively. As shown in FIG. 2, each channel includes an amplifier (191, 192, 193), a pulse detector (201, 202, 203) and a decoder (211, 212, 213). On each channel, the magnetic readout output of the associated read head is amplified and then applied to the corresponding pulse detector. The pulse detector processes the amplified output signal and provides a positive pulse signal indicative of the occurrence of each positive (i.e. data) pulse and a negative pulse signal indicative of the occurrence of each negative (i.e. clock) pulse to the corresponding decoder. In known fashion, the decoder generates a binary stream data signal for the respective channel from the input positive and negative pulse signals. Suitable exemplary decoding circuitry is described in commonly assigned U.S. Pat. Nos. 4,876,697 and 4,964,139 and 4,965,575, the disclosures of which are incorporated herein by reference. The binary stream data signal from each channel is fed to data evaluator 225.

Data evaluator 225 preferably includes serial memories 221, 222 and 223 for storing the bits of each binary stream data signal. Each data signal preferably corresponds in size to the limited data set being transferred.

With the magnetic read heads positioned at a common longitudinal position relative to track 140, the binary stream data signals stored in the respective serial memories will be synchronous. Longitudinally staggered arrangements of the read heads are also possible resulting in phase shifted binary stream data signals.

The readout apparatus described so far facilitates continuous parallel monitoring of data full-width magnetically recorded in track 140. In ideal circumstances, the data signals output from the three channels would be identical and correspond exactly to the limited data set input information. However, for various reasons, e.g. jitter, wander, inadequate HFI, the data contained in the actual data signals may include corruption error. Accordingly, data evaluator 225 also includes an error detector 220.

Error detector 220 may, for example, comprise a microcomputer or microprocessor programmed to check the binary streams stored in serial memories 221, 222 and 223 for corruption error. Various known error checking schemes may be employed for this purpose. For instance, error detector 220 may perform one or more of the following tests: a parity check, a longitudinal redundancy check, a comparison to a priori knowledge of expected data content, or a comparison between synchronous binary streams. These or other known approaches for examining the data content of the data signal from each channel can be readily implemented by those versed in this art. In this way, a data signal free of corruption error can be identified and output from data evaluator 225.

The parallel redundancy and linear redundancy features of the present invention, in effect create a readback map of written information as shown in FIG. 3. As illustrated, data signals or packets containing various kinds of corruption errors (identified as A', A'', A''', A'''') may be interspersed with valid data signals or packets (identified as A). Note that the zone of correct information does not necessarily always overlie a centered read head. By examining the data content of the plural data signals output from the parallel channels, the present invention facilitates identification of data transferred without corruption. The combination of parallel and linear redundancy tends to ensure successful data transfer despite a less than perfect head-to-film interface and other data corrupting influences.

From the foregoing description, it will be apparent that a new method and apparatus for enhancing the reliability of data transfer between stages of photographic filmstrip use and processing has been developed. This new approach is particularly advantageous in that it allows magnetics on film to be applied in simple inexpensive cameras. The invention allows the transfer of a limited data set from such cameras with high reliability and low apparatus cost. Further, this new approach is fully compatible with the film medium, readout apparatus and other features of the earlier developed high density full magnetics data transfer system using dedicated magnetic tracks. The numerous benefits and applications of the earlier developed full magnetics system thus remain available with this invention and the overall system is extended to include simple lowcost cameras.

Although a particular embodiment has been described and depicted herein, it will be apparent to those skilled in this art that various modifications, substitutions, additions, and the like may be made without departing from the spirit of the invention. For instance, the longitudinally extending track or swath may be positioned in locations other than between the perforations and film edge. Audio, magnetoresistive and other types of magnetic recording and playback heads may be used, and the number and location of read heads may vary from that shown. Similarly other types and sizes of photographic film may be employed. These and other variations which fall within the confines of the appended claims are considered to be within the scope of this invention.

What is claimed is:

1. Data readout and evaluation apparatus for use in transferring data from a first stage to a second stage of photographic filmstrip use and processing, the data being magnetically recorded in a longitudinally extending track in a film frame of the photographic filmstrip for data transfer, the data being susceptible to corruption error during data transfer, the apparatus comprising:
- a plurality of laterally offset magnetic read heads associated with said track, the heads being positioned at said second stage in alignment with a nominal track path, at least one of said heads being aligned with the track of the filmstrip regardless of lateral excursion of the track from said nominal track path;
- a plurality of data signal channels equal in number to the plurality of read heads, each channel being connected to a respective one of said read heads and providing a data signal representative of magnetic readout thereof; and
- data evaluation means for receiving said data signals from said channels, examining the data content of said signals and determining therefrom whether an individual data signal contains data which has been transferred without corruption error.

2. The apparatus of claim 1 wherein said channels comprise parallel independently operating channels.

3. The apparatus of claim 1 wherein said data evaluation means comprises: means for storing said data signals, and error detection means for detecting corruption error in said stored data signals.

4. The apparatus of claim 3 wherein said error detection means comprises means for performing at least one of the following functions:
- (a) examining the data content of an individual stored data signal to determine the existence of a corruption error therein; and
- (b) comparing the data content of multiple stored data signals to identify the existence of a corruption error.

5. The apparatus of claim 3 wherein the data is magnetically recorded in said longitudinally extending track in encoded form, each of said channels includes decoding means; the data signal of each channel comprises a binary stream output from the decoding means of the channel; and the memory means comprises serial memory means for storing the binary stream of each channel.

6. The apparatus of claim 5 wherein the error detection means comprises means for performing at least one of the following tests:
- (a) a parity check;
- (b) a longitudinal redundancy check;
- (c) a comparison to a priori knowledge of expected data content; and
- (d) a comparison between synchronous binary streams.

7. The apparatus of claim 6 wherein: the data is magnetically recorded in pulse position encoded form; each channel further comprises pulse detector means for receiving an amplified output signal from the read head of the channel and providing a positive pulse signal indicative of occurrence of a positive pulse in said amplified output signal and a negative pulse signal indicative of occurrence of a negative pulse in said amplified output signal to the decoding means of the channel; and said decoding means generates the binary stream of the channel from said positive pulse and negative pulse signals.

8. The apparatus of claim 1 in combination with data recording apparatus at said first stage, said data recording apparatus comprising a recording head having a width which spans said plurality of read heads, and means for full-width recording of a limited data set repetitively along the longitudinally extending track in the film frame with said recording head; and
- wherein the data signal provided by each channel of the data readout and evaluation apparatus corresponds in size to said limited data set.

9. The apparatus of claim 8 wherein said first stage comprises a camera and said second stage comprises a photofinisher.

10. Apparatus for use in transferring data from a first stage to a second stage of photographic filmstrip use and processing, the data being susceptible to corruption error during data transfer, the apparatus comprising:
- data recording means at said first stage for magnetically recording data in a longitudinally extending track in a film frame of the photographic filmstrip;
- plural laterally offset magnetic reading means at said second stage for reading said track in parallel and providing plural data signals therefrom; and
- data evaluation means located at said second stage and connected to said plural magnetic reading means for examining the data content of said plural data signals and determining therefrom whether an individual data signal contains data free from corruption error.

11. The apparatus of claim 10 wherein said data recording means comprises means for full-width recording of a limited data set repetitively along the longitudinally extending track in the film frame, and wherein each of the plurality of data signals corresponds in size to said limited data set.

12. Data recording apparatus for use in transferring data from a first stage to a second stage of photographic filmstrip use and processing, the data being magnetically recorded in a magnetic layer of a photographic filmstrip at said first stage, and read by a plurality of laterally offset magnetic read heads at said second stage, the data being susceptible to corruption error during data transfer, the apparatus comprising:
- magnetic recording means at said first stage for full-width magnetic recording of data in a longitudinally extending swath in a film frame of said photographic filmstrip, the swath having a width which spans said plurality of laterally offset read heads, and the swath always coinciding with at least one of said read heads regardless of lateral excursion of the swath; and
- means for providing data to said magnetic recording means.

13. The data recording apparatus of claim 12 wherein said means for providing data comprises means for repetitively providing a limited data set to said data recording means for full-width recording of said limited data set repetitively along the swath in the film frame.

14. The apparatus of claim 13 further comprising data encoding means for encoding data of said limited data set in pulse position encoded form for recording.

15. A method for reading out and evaluating data transferred from a first stage to a second stage of photographic filmstrip use and processing, the data being magnetically recorded in a longitudinally extending track in a film frame of a photographic filmstrip, the data being susceptible to corruption error during data transfer, the method comprising the steps of:
- continually monitoring the track with a plurality of laterally offset magnetic read heads at said second stage;
- generating a plurality of data signals equal in number to the plurality of read heads, each data signal being representative of magnetic readout of a corresponding read head; and examining the data content of said data signals and determining therefrom whether an individual data signal contains data which has been transferred without corruption error.

16. The method of claim 15 further comprising the step of processing outputs of said plurality of magnetic read heads to generate said plurality of data signals in a plurality of parallel independently operating channels.

17. The method of claim 15 further comprising the step of storing said plurality of data signals; and wherein said examining step comprises performing at least one of the following functions:
   (a) examining the data content of an individual stored data signal to determine the existence of corruption error therein, and
   (b) comparing the data content of multiple stored data signals to identify the existence of corruption error.

18. The method of claim 15 wherein said plurality of data signals comprise respective binary streams; and wherein the examining step comprises performing at least one of the following tests:
   (a) a parity check,
   (b) a longitudinal redundancy check,
   (c) a comparison to a priori knowledge of expected data content; and
   (d) a comparison between synchronous binary streams.

19. The method of claim 18 wherein the data is magnetically recorded in said longitudinally extending track in encoded form; and further comprising the steps of: decoding outputs from said plurality of read heads to generate the respective binary streams, and storing the respective binary streams for data content examination.

20. In a method for recording data to be transferred from a first stage to a second stage of photographic filmstrip use and processing wherein the data is magnetically recorded in a magnetic layer of a photographic filmstrip at said first stage for readout by a plurality of laterally offset magnetic read heads at said second stage, and wherein the data is susceptible to corruption error during data transfer, the improvement comprising:
   full-width magnetic recording of the data in a longitudinally extending swath in a film frame of the photographic filmstrip, the swath having a width which spans the plurality of laterally offset magnetic read heads and a limited lateral excursion which ensures that at least one of said read heads is always aligned with the swath at said second stage.

21. The improved method of claim 20 wherein said data recording step further comprises full-width recording of a limited data set repetitively along the longitudinally extending swath in the film frame.

22. A method for enhancing the reliability of data transfer from a first stage to a second stage of photographic filmstrip use and processing, the data being susceptible to corruption error during transfer, comprising the steps of:
   magnetically recording a limited data set repetitively along a longitudinally extending swath in a film frame of the photographic filmstrip with a single wide magnetic recording head at said first stage;
   monitoring said swath in said second stage with a plurality of laterally offset magnetic read heads;
   generating from said plurality of read heads a like plurality of data signals, each data signal corresponding in size to said limited data set; and
   examining the data content of said plurality of data signals and determining therefrom whether an individual data signal contains a limited data set which has been transferred without corruption error. .

* * * * *